US008059661B2

(12) United States Patent
Patel et al.

(10) Patent No.: US 8,059,661 B2
(45) Date of Patent: Nov. 15, 2011

(54) METHODS AND APPARATUS FOR USING DHCP FOR HOME ADDRESS MANAGEMENT OF NODES ATTACHED TO AN EDGE DEVICE AND FOR PERFORMING MOBILITY AND ADDRESS MANAGEMENT AS A PROXY HOME AGENT

(75) Inventors: Alpesh Patel, Pleasanton, CA (US); Kent K. Leung, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 1333 days.

(21) Appl. No.: 11/027,466

(22) Filed: Dec. 29, 2004

(65) Prior Publication Data
US 2006/0140164 A1 Jun. 29, 2006

(51) Int. Cl.
H04L 12/28 (2006.01)
(52) U.S. Cl. .................................. 370/395.54; 370/389
(58) Field of Classification Search .................. None
See application file for complete search history.

(56) References Cited

U.S. PATENT DOCUMENTS

| | | |
|---|---|---|
| 4,692,918 A | 9/1987 | Elliot et al. |
| 5,016,244 A | 5/1991 | Massey, Jr. et al. |
| 5,018,133 A | 5/1991 | Tsukakoshi et al. |
| 5,218,600 A | 6/1993 | Schenkyr et al. |
| 5,371,852 A | 12/1994 | Attanasio et al. |
| 5,414,704 A | 5/1995 | Spinney |
| 5,473,599 A | 12/1995 | Li et al. |
| 5,488,412 A | 1/1996 | Majeti et al. |
| 5,506,987 A | 4/1996 | Abramson et al. |
| 5,572,528 A | 11/1996 | Shuen |
| 5,586,121 A | 12/1996 | Moura et al. |
| 5,619,552 A | 4/1997 | Karppanen et al. |
| 5,729,537 A | 3/1998 | Billstrom |

(Continued)

FOREIGN PATENT DOCUMENTS

EP 1126682 8/2001

(Continued)

OTHER PUBLICATIONS

Perkins, Editor, "IP Mobility Support for IPv4" RFC 3344, Aug. 2002, 99 pp.

(Continued)

*Primary Examiner* — Robert Wilson
(74) *Attorney, Agent, or Firm* — Weaver Austin Villeneuve & Sampson

(57) ABSTRACT

Methods and apparatus for supporting the management of mobility and addresses by a Customer Premises Edge (CPE) router in a Mobile IP environment are disclosed. When a network prefix is allocated by a DHCP router to the CPE router, the CPE router divides the network prefix among its interfaces, and allocates home addresses to Mobile Nodes connected to its interfaces, as appropriate. The CPE router also assists in performing Duplicate Address Detection (DAD) to ensure that a home address that has been allocated has not already been assigned to another node. Upon completion of registration of a Mobile Node that is connected to one of the interfaces of the CPE router with its Home Agent, the CPE router assists in routing traffic to the Mobile Node. In addition, the CPE router assists in notifying nodes when one of the Mobile Nodes has moved, as well as when one of the Mobile Nodes has de-registered with the Home Agent.

49 Claims, 6 Drawing Sheets

U.S. PATENT DOCUMENTS

| | | | |
|---|---|---|---|
| RE35,774 E | 4/1998 | Moura et al. | |
| 5,793,763 A | 8/1998 | Mayes et al. | |
| 5,818,845 A | 10/1998 | Moura et al. | |
| 5,825,759 A | 10/1998 | Liu | |
| 5,828,655 A | 10/1998 | Moura et al. | |
| 5,835,696 A | 11/1998 | Hess | |
| 5,835,725 A * | 11/1998 | Chiang et al. | 709/228 |
| 5,859,852 A | 1/1999 | Moura et al. | |
| 5,862,345 A | 1/1999 | Okanoue et al. | |
| 5,862,451 A | 1/1999 | Grau et al. | |
| 5,872,773 A | 2/1999 | Katzela et al. | |
| 5,892,903 A | 4/1999 | Klaus | |
| 5,943,604 A | 8/1999 | Chen et al. | |
| 5,946,047 A | 8/1999 | Levan | |
| 5,946,048 A | 8/1999 | Levan | |
| 5,949,753 A | 9/1999 | Alexander, Jr. et al. | |
| 5,950,205 A | 9/1999 | Aviani, Jr. | |
| 5,953,335 A | 9/1999 | Erimli et al. | |
| 5,956,346 A | 9/1999 | Levan | |
| 5,959,660 A | 9/1999 | Levan | |
| 5,959,968 A | 9/1999 | Chin et al. | |
| 5,959,997 A | 9/1999 | Moura et al. | |
| 5,982,745 A | 11/1999 | Wolff et al. | |
| 5,989,060 A | 11/1999 | Coile et al. | |
| 5,999,536 A | 12/1999 | Kawafuji et al. | |
| 6,006,266 A | 12/1999 | Murphy et al. | |
| 6,016,388 A | 1/2000 | Dillon | |
| 6,023,724 A * | 2/2000 | Bhatia et al. | 709/218 |
| 6,052,718 A | 4/2000 | Gifford | |
| 6,078,575 A | 6/2000 | Dommety et al. | |
| 6,195,705 B1 | 2/2001 | Lueng | |
| 6,230,012 B1 | 5/2001 | Willkie et al. | |
| 6,230,326 B1 | 5/2001 | Unger et al. | |
| 6,233,616 B1 | 5/2001 | Reid | |
| 6,236,678 B1 | 5/2001 | Horton et al. | |
| 6,240,089 B1 | 5/2001 | Okanoue et al. | |
| 6,295,276 B1 | 9/2001 | Datta et al. | |
| 6,298,063 B1 | 10/2001 | Coile et al. | |
| 6,339,830 B1 | 1/2002 | See et al. | |
| 6,345,294 B1 | 2/2002 | O'Toole et al. | |
| 6,389,027 B1 | 5/2002 | Lee et al. | |
| 6,397,260 B1 | 5/2002 | Wils et al. | |
| 6,421,714 B1 | 7/2002 | Rai et al. | |
| 6,427,170 B1 | 7/2002 | Sitaraman et al. | |
| 6,442,616 B1 | 8/2002 | Inoue et al. | |
| 6,449,250 B1 | 9/2002 | Otani et al. | |
| 6,466,964 B1 | 10/2002 | Leung et al. | |
| 6,487,605 B1 | 11/2002 | Leung | |
| 6,505,254 B1 | 1/2003 | Johnson et al. | |
| 6,510,162 B1 | 1/2003 | Fijolck et al. | |
| 6,512,774 B1 | 1/2003 | Vepa et al. | |
| 6,515,974 B1 | 2/2003 | Inoue et al. | |
| 6,556,591 B2 | 4/2003 | Bernnath et al. | |
| 6,567,664 B1 | 5/2003 | Bergenwall et al. | |
| 6,611,868 B1 | 8/2003 | Arutyunov | |
| 6,621,810 B1 | 9/2003 | Leung | |
| 6,636,498 B1 | 10/2003 | Leung | |
| 6,650,624 B1 | 11/2003 | Quigley et al. | |
| 6,650,641 B1 | 11/2003 | Albert et al. | |
| 6,654,359 B1 | 11/2003 | La Porta et al. | |
| 6,687,245 B2 | 2/2004 | Fangman et al. | |
| 6,697,360 B1 * | 2/2004 | Gai et al. | 370/389 |
| 6,765,892 B1 | 7/2004 | Leung et al. | |
| 6,766,168 B1 | 7/2004 | Lim | |
| 6,771,623 B2 | 8/2004 | Ton | |
| 6,779,039 B1 | 8/2004 | Bommareddy et al. | |
| 6,795,857 B1 | 9/2004 | Leung et al. | |
| 6,801,949 B1 | 10/2004 | Bruck et al. | |
| 6,804,221 B1 | 10/2004 | Magret et al. | |
| 6,839,829 B1 | 1/2005 | Daruwalla et al. | |
| 6,885,667 B1 | 4/2005 | Wilson | |
| 6,892,069 B1 | 5/2005 | Flynn | |
| 6,954,790 B2 | 10/2005 | Forslow | |
| 7,003,294 B2 | 2/2006 | Singhai et al. | |
| 7,006,472 B1 * | 2/2006 | Immonen et al. | 370/332 |
| 7,020,157 B2 * | 3/2006 | Koch et al. | 370/463 |
| 7,031,275 B1 | 4/2006 | Borella et al. | |
| 7,042,876 B1 | 5/2006 | Jayasenan et al. | |
| 7,058,007 B1 | 6/2006 | Daruwalla et al. | |
| 7,068,712 B1 | 6/2006 | Zang et al. | |
| 7,239,618 B1 * | 7/2007 | La Porta et al. | 370/331 |
| 7,286,537 B2 * | 10/2007 | Roh | 370/392 |
| 7,292,558 B2 * | 11/2007 | Adrangi et al. | 370/338 |
| 2002/0012327 A1 | 1/2002 | Okada | |
| 2002/0073182 A1 | 6/2002 | Zakurdaev et al. | |
| 2002/0120697 A1 | 8/2002 | Generous et al. | |
| 2002/0191562 A1 | 12/2002 | Kumaki et al. | |
| 2003/0037165 A1 | 2/2003 | Shinomiya et al. | |
| 2003/0101243 A1 | 5/2003 | Donahue et al. | |
| 2003/0104814 A1 | 6/2003 | Gwon et al. | |
| 2003/0126262 A1 | 7/2003 | Yoshida et al. | |
| 2003/0217145 A1 | 11/2003 | Leung et al. | |
| 2003/0224788 A1 | 12/2003 | Leung et al. | |
| 2004/0072557 A1 | 4/2004 | Paila et al. | |
| 2004/0218558 A1 * | 11/2004 | Johansson | 370/313 |

FOREIGN PATENT DOCUMENTS

| | | |
|---|---|---|
| WO | WO 98/31107 | 7/1998 |

OTHER PUBLICATIONS

Johnson, et al., "Mobility Support in IPv6" RFC 3775, Jun. 2004, 129 pp.

Troan, et al., "IPv6 Prefix Options for Dynamic Host Configuration Protoco. (DHCP) Version 6," RFC 3633, Dec. 2003.

Narten, et al., "Neighbor Discovery for IP Version 6 (IPv6)", RFC 2461, Dec. 1998, 93 pp.

Thomson, et al., "IPv6 Stateless Address Autoconfiguration", RFC 2462, Dec. 1998, 25 pp.

Miyakawa, et al., "Requirements for IPv6 Prefix Delegation", RFC 3769, Jun. 2004, 6 pp.

Jang, et al, "DHCP Option for Home Agent Discovery in MIPv6", IETF Mobile IPv6 Working Group, Internet Draft, May 31, 2004, 16 pp.

Examiner's Communication pursuant to Article 96(2) EPC dated Mar. 1, 2006, from related European Patent Application No. 03742214.4, Methods and Apparatus for Anchoring of Mobile Nodes Using DNS, 6 pages.

Levkowetz, H. et al., "Mobile IP NAT/NAPT Traversal using UDP Tunneling," Internet Draft, Nov. 2001, 23 pages.

Khalil, Mohamed M. et al., "Generalized NAI (GNAI) Extension for Mobile IPv4," Internet Draft, Oct. 2001, 6 pages.

Adrangi, Farid and Prakash, Iyer, "Mobile IPv4 Traversal Across Firewalls," Internet Draft, Nov. 13, 2001, 30 pages.

Cardellini, V. et al, "Dynamic Load Balancing in Web-Server Systems," IEEE Internet computing, May 1999, XP002170537.

Heissenhuber, F. et al., "Home Agent Redundancy and Load Balancing in Mobile IPV6," Broadband communications, Proceedings of the International IFIP-IEEE Conference on Broadband communications, XX, XX, Nov. 10, 1999, pp. 235-244, XP009002035.

Johnson, D. B. et al, "Mobility support in IPV6," Internet Draft, XX, XX, Jun. 1, 2002, pp. I-V, 1-157, XP0022963720.

International Search Report, Application No. PCT/US03/20106, Mailed Nov. 14, 2003; 4 pages.

"Wireless IP Network Standard," Version 3.0.0, Version Date: Jul. 16, 2001, 62 pages.

Calhoun et al, "Diameter Base Protocol," http://www.ietf.org/internet-drafts/draft-ietf-aaa-diameter-10.txt, Apr. 2002, 139 pages.

Calhoun et al, "Diameter Mobile IPv4 Application," http://www.ietf.org/internet-drafts/draft-ietf-aaa-mobileip-10.txt, Apr. 2002, 48 pages.

U.S. Appl. No. 10/187,084, Leung et al, "Methods and Apparatus for Anchoring of Mobile Nodes Using DNS," filed Jun. 28, 2002.

Glass, "Mobile IP Agents as DHCP Proxies", Internet Draft, Sun Microsystems, Inc., Mar. 2, 2000.

Release notes for 3Com Corporation, "Conducting a Redundant Route for Network Resiliency," Mar. 1994, *NET Builder Family Bridge/Router* pp. 27-29.

J. Moy, RFC 1247 "OSPF Version 2," Jul. 19, 1991.

D. Oran, RFC 1142 "OSI IS-IS Intra-domain Routing Protocol," Feb. 1990.

Uyless Black, "TCP/IP and Related Protocols," 1992, *McGraw-Hill, Inc.,* pp. 226-249.

T. Li, et al., RFC 2281 "Cisco Hot Standby Router Protocol (HSRP)," Mar. 1998, Network Working Group.

K. Egevang et al., "The IP Network Address Translator (NAT)", Network Working Group, pp. 1-10, May 1994.

Y. Rekhter, et al, "Address Allocation for Private Internets," RFC: 1918, Network Working Group, Feb. 1996, 9 Pages.

P. Srisuresh, et al, "Load Sharing Using IP Network Address Translation (LSNAT)," RFC: 2391, Network Working Group, Aug. 1998, 18 Pages.

P. Srisuresh, et al, "IP Network Address Translator (NAT) Terminology and Considerations ," RFC: 2663, Network Working Group, Aug. 1999, 30 Pages.

E. Gerich, "Guidelines for Management of IP Address Space," RFC: 1466, Network Working Group, May 1993, 10 Pages.

Chambless, et al., "Home Agent Redundancy Protocol (HARP)," Oct. 27, 1997.

Network Working Group, RFC 2002 "IP Mobility Support," Oct. 1996.

C.E. Perkins and T. Jagannadh, "DHCP for Mobile Networking with TCP/IP," IBM, Watson Research Center IEEE, Apr. 1995.

3Com Corporation, "Configuring Boundary Routing System Architecture," NETBuilder Family Bridge/Router Release Notes, Mar. 1994, pp. 26-29.

Nosella, et al. "Gateway Load Balancing Protocol," U.S. Appl. No. 09/883,674, filed Jun. 18, 2001, 48 Pages.

Kanekar, et al., "Load Sharing and Redundancy Scheme," U.S. Appl. No. 09/342,589, filed Jun. 29, 1999, 75 Pages.

Eager et al., "Adaptive Load Sharing in Homogeneous Distributed Systems," IEEE, Transactions on Software Engineering, vol. Se-12, No. 5, May 1986, pp. 662-675.

Akamai Technologies, Inc.—Global Internet Content Delivery—"How FreeFlow Works," webmaster@akamai.com 1999-2000.

Digital Island, Inc.—eBusiness Without Limits-, "Enabling Technologies," http://www.digisle.net. No date.

Internap, "Preferred Collocation Services," http://www.internap.com Copyright 2001 Internap Network Services Corporation.

Meyer, et al., RFC 2026 entitled "Generic Routing Encapsulation (GRE)," Jan. 2000, Internet Engineering Task Force, 9 pages.

Mockapetris, P., RFC 1034, entitled "Domain Names—Concepts and Facilities," Nov. 1987, Internet Engineering Task Force, 31 pages.

Information Sciences Institute, RFC 793 entitled Transmission Control Protocol—DARPA Internet Program—Protocol Specification, Sep. 1981, Internet Engineering Task Force, 49 pages.

Gifford, "Replica Routing," U.S. Appl. No. 09/472,964, filed Dec. 28, 1999, 37 pages.

Lu, et al., "Automatic Network Addresses Assignment and Translation Interference," U.S. Appl. No. 60/160,535, filed Oct. 20, 1999, 127 pages.

Lu, et al., "Method and Apparatus for Automatic Network Address Assignment," U.S. Appl. No. 60/178,063, filed Jan. 24, 2000, 74 pages.

Johnson, et al., "Method and Apparatus for Determining a Network Topology in the Presence of Network Address Translation," U.S. Appl. No. 60/178,062, filed Jan. 24, 2000, 32 pages.

Toole et al., "Fast-Changing Network Status and Load Monitoring and Feedback," U.S. Appl. No. 60/177,985, filed Jan. 25, 2000, 20 pages.

Johnson, "A Method and Apparatus for Minimalist Approach to Implementing Server Selection," U.S. Appl. No. 60/177,415, filed Jan. 21, 2000, 39 pages.

International Search Report with Written Opinion, Application No. PCT/US2004/019617, International filing date Jun. 18, 2004, mailed Jul. 10, 2004.

U.S. Office Action dated May 3, 2005 from U.S. Appl. No. 09/883,674, filed Jun. 18, 2001.

Leung, et al., "Methods and Apparatus for Implementing Home Agent Redundancy", U.S. Appl. No. 10/008,494, filed Nov. 9, 2001.

* cited by examiner

METHODS AND APPARATUS FOR USING DHCP FOR HOME ADDRESS MANAGEMENT OF NODES ATTACHED TO AN EDGE DEVICE AND FOR PERFORMING MOBILITY AND ADDRESS MANAGEMENT AS A PROXY HOME AGENT

BACKGROUND OF THE INVENTION

The present invention relates to Mobile IP network technology and home address management. More specifically, this invention relates to mechanisms for managing addresses associated with a network prefix via an edge router that serves as a proxy Home Agent for management of the addresses.

Mobile IP is a protocol which allows laptop computers or other mobile computer units (referred to as "Mobile Nodes" herein) to roam between various sub-networks at various locations—while maintaining internet and/or WAN connectivity. Without Mobile IP or a related protocol, a Mobile Node would be unable to stay connected while roaming through various sub-networks. This is because the IP address required for any node to communicate over the internet is location specific. Each IP address has a field that specifies the particular sub-network on which the node resides. If a user desires to take a computer which is normally attached to one node and roam with it so that it passes through different sub-networks, it cannot use its home base IP address. As a result, a business person traveling across the country cannot merely roam with his or her computer across geographically disparate network segments or wireless nodes while remaining connected over the internet. This is not an acceptable state-of-affairs in the age of portable computational devices.

To address this problem, the Mobile IP protocol has been developed and implemented. An implementation of Mobile IP is described in RFC 3344 of the Network Working Group, C. Perkins, Ed., "IP Mobility Support for IPv4," August 2002. Mobile IP is also described in the text "Mobile IP Unplugged" by J. Solomon, Prentice Hall. Both of these references are incorporated herein by reference in their entireties and for all purposes.

A similar approach has been described in Mobile IP for IPv6. This is described in RFC3775, which is incorporated herein by reference in its entirety and for all purposes. RFC 3775, entitled "Mobility Support in IPv6," published in June, 2004, by D. Johnson et al discloses a protocol which allows nodes to remain reachable while roaming in IPv6. This RFC defines the entities of Home Agent (HA), Mobile Node (MN) and Correspondent Node (CN), and describes the Mobile IP registration process with reference to an IPv6 environment.

RFC3775 specifies a method for performing registration of a Mobile Node with its Home Agent in IPv6. Specifically, the Mobile Node provides its care-of address (i.e., location on the foreign network) to the Home Agent via a Binding Update message. In contrast to the registration process that is performed via a Foreign Agent in Mobile IPv4, registration is performed via a co-located care-of address of the Mobile Node in Mobile IPv6. In other words, the care-of address is associated with the Mobile Node rather than a separate entity. The Home Agent then sends a Binding Acknowledgement message to the Mobile Node upon successful completion of registration of the Mobile Node with the Home Agent.

The Mobile IP process in a Mobile IP environment are illustrated in FIG. 1. As shown there, a Mobile IP environment 2 includes the internet (or a WAN) 4 over which a Mobile Node 6 can communicate remotely via mediation by a Home Agent 8 and may also include a Foreign Agent 10 in Mobile IPv4. In the absence of a Foreign Agent in a Mobile IPv4 environment, or in a Mobile IPv6 environment in which a Foreign Agent is not implemented, the Mobile Node 6 can obtain a topologically correct IP address (i.e., collocated IP address) and register this IP address with the Home Agent. (In a Mobile IPv6 environment, this is accomplished via an Access Router rather than a Foreign Agent.) Typically, the Home Agent and Foreign Agent are routers or other network connection devices performing appropriate Mobile IP functions as implemented by software, hardware, and/or firmware. A particular Mobile Node (e.g., a laptop computer) plugged into its home network segment connects with the internet through its designated Home Agent. When the Mobile Node roams, it communicates via the internet through an available Foreign Agent in Mobile IPv4 or an Access Point in Mobile IPv6. Presumably, there are many Foreign Agents (or Access Points) available at geographically disparate locations to allow wide spread internet connection via the Mobile IP protocol. Note that it is also possible for the Mobile Node to register directly with its Home Agent.

As shown in FIG. 1, Mobile Node 6 normally resides on (or is "based at") a network segment 12 which allows its network entities to communicate over the internet 4 through Home Agent 8 (an appropriately configured router denoted R2). Note that Home Agent 8 need not directly connect to the internet. For example, as shown in FIG. 1, it may be connected through another router (a router R1 in this case). Router R1 may, in turn, connect one or more other routers (e.g., a router R3) with the internet.

Now, suppose that Mobile Node 6 is removed from its home base network segment 12 and roams to a remote network segment 14. Network segment 14 may include various other nodes such as a PC 16. The nodes on network segment 14 communicate with the internet through a router which doubles as Foreign Agent 10 (or Access Point). Mobile Node 6 may identify Foreign Agent 10 in Mobile IPv4 or an Access Point in Mobile IPv6 through various solicitations and advertisements which form part of the Mobile IP protocol. When Mobile Node 6 engages with network segment 14 in Mobile IPv4, Foreign Agent 10 relays a registration request to Home Agent 8 (as indicated by the dotted line "Registration"). Similarly, in Mobile IPv6, when the Mobile Node 6 engages with network segment 14, an Access Point relays a Binding Update message to the Home Agent. The Home and Foreign Agents/Access Points may then negotiate the conditions of the Mobile Node's attachment to Foreign Agent 10 (or Access Point). For example, the attachment may be limited to a period of time, such as two hours. When the negotiation is successfully completed, Home Agent 8 updates an internal "mobility binding table" which specifies the care-of address (e.g., a collocated care-of address or the Foreign Agent's IP address) in association with the identity of Mobile Node 6. Further, the Foreign Agent 10 updates an internal "visitor table" in Mobile IPv4, which specifies the Mobile Node address, Home Agent address, etc. In effect, the Mobile Node's home base IP address (associated with segment 12) has been shifted to its care-of address (e.g., Foreign Agent's IP address associated with segment 14 in Mobile IPv4 or a co-located care-of address in Mobile IPv6).

Now, suppose that Mobile Node 6 wishes to send a message to a Correspondent Node 18 from its new location. In Mobile IPv4, a message from the Mobile Node is then packetized and forwarded through Foreign Agent 10 over the internet 4 and to Correspondent Node 18 (as indicated by the dotted line "packet from MN") according to a standard internet protocol. If Correspondent Node 18 wishes to send a message to Mobile Node—whether in reply to a message from the Mobile Node or for any other reason—it addresses that message to the IP address of Mobile Node 6 on subnetwork 12. The packets of that message are then forwarded over the internet 4 and to router R1 and ultimately to Home Agent 8 as indicated by the dotted line ("packet to MN(1)"). From its mobility binding table, Home Agent 8 recognizes that Mobile Node 6 is no longer attached to network segment 12. It then encapsulates the packets from Correspondent Node 18 (which are addressed to Mobile Node 6 on network segment 12) according to a Mobile IP protocol and forwards these encapsulated packets to a "care of" address for Mobile Node 6 as shown by the dotted line ("packet to MN(2)"). The care-of address may be, for example, the IP address of Foreign Agent 10 or a co-located care-of address associated with the Mobile Node 6. Foreign Agent 10 (if present) then strips the encapsulation and forwards the message to Mobile Node 6 on sub-network 14. The packet forwarding mechanism implemented by the Home and Foreign Agents is often referred to as "tunneling." In the absence of a Foreign Agent, packets are tunneled directly to the Mobile Node 6 collocated care-of address.

RFC 3633, which is incorporated herein by reference for all purposes, discloses a prefix delegation feature. With this feature, a DHCP server may allocate a network prefix rather than a single IP address. Unfortunately, since service providers generally do not want Home Agent functionality to be performed within the customer network, this prefix delegation feature cannot easily be incorporated into a Mobile IP environment.

In view of the above, it would be desirable if the new prefix delegation feature could be implemented in a Mobile IP environment.

SUMMARY OF THE INVENTION

Methods and apparatus for supporting the management of mobility and addresses by a Customer Premises Edge (CPE) router in a Mobile IP environment are disclosed. This is accomplished, in part, by dividing a network prefix that has been allocated to the CPE router among one or more interfaces of the CPE router. The CPE router may then function as the "virtual" home network for this network prefix.

In accordance with one aspect of the invention, when a network prefix is allocated by a DHCP router to the CPE router, the CPE router divides the network prefix among its interfaces. The CPE router may also allocate home addresses to Mobile Nodes connected to its interfaces, as appropriate.

In accordance with one embodiment, the Home Agent "owns" the network prefix and is aware of network prefixes that are allocated to CPE routers by the DHCP server. This may be accomplished, for example, by implementing the Home Agent in combination with the DHCP server. As another example, the Home Agent may be notified by the DHCP server when a network prefix is allocated. As yet another example, the Home Agent may be connected to the DHCP server, and therefore may intercept DHCP request and reply packets.

In accordance with another aspect of the invention, the CPE router also assists in performing Duplicate Address Detection (DAD) to ensure that a home address that has been allocated has not already been assigned to another node. Specifically, the CPE sends a neighbor solicitation to one or more of the plurality of nodes in accordance with RFC 2461, wherein the neighbor solicitation identifies at least one address of one of the plurality of nodes that has attempted to register with the Home Agent. When a neighbor advertisement is received from one of the plurality of nodes in accordance with RFC 2461, the neighbor advertisement may be forwarded to the Home Agent indicating that there is an address conflict, thereby enabling the Home Agent to send an error message to the node that has attempted to register with the Home Agent.

In accordance with yet another aspect of the invention, upon completion of registration of a Mobile Node that is connected to one of the interfaces of the CPE router with its Home Agent, the CPE router assists in routing traffic to the Mobile Node. For instance, the CPE router may route traffic directly to the Mobile Node. Alternatively, the CPE router may tunnel traffic to the Home Agent so that it can be forwarded to the Mobile Node.

In accordance with yet another aspect of the invention, the CPE router assists in notifying nodes when one of the Mobile Nodes has moved, as well as when one of the Mobile Nodes has de-registered with the Home Agent. Specifically, the CPE may send a neighbor advertisement advertising the node's movement (or de-registration). The corresponding entry in the neighbor cache of the nodes and the CPE router may be modified or deleted, as appropriate.

In accordance with one aspect of the invention, the CPE router sets the H bit in its router advertisement as per RFC3775 indicating to the Mobile Nodes on the link that they are at home. Thus, when the Mobile Node is at home (actually at the CPE link), it does not register with the real Home Agent.

In accordance with another aspect of the invention, the invention pertains to a system operable to manage addresses associated with a network prefix that has been allocated to a CPE router, and to support the mobility of Mobile Nodes that have been allocated addresses associated with the network prefix. The system includes one or more processors and one or more memories. At least one of the memories and processors are adapted to provide at least some of the above described method operations. In yet a further embodiment, the invention pertains to a computer program product for performing the disclosed methods. The computer program product has at least one computer readable medium and computer program instructions stored within at least one of the computer readable product configured to perform at least some of the above described method operations.

These and other features and advantages of the present invention will be presented in more detail in the following specification of the invention and the accompanying figures, which illustrate, by way of example, the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Embodiments of the invention support prefix delegation by a DHCP server. The network prefix is delegated to a network device such as a Customer Premises Edge (CPE) router in a cable network, thereby enabling the CPE router to act as proxy Home Agent to manage addresses that have been allocated by the CPE router based upon the network prefix. Specifically, the CPE router may allocate network prefixes among its interfaces, as well as assign addresses to nodes connected to the CPE router.

In the following description, the phrase "CPE router" generally refers to a router at the edge of a customer network. Similarly, the term "CMTS" generally refers to a Cable Modem Termination System, or "cable head end router," which is responsible for routing communications to the CPE routers in a cable network. However, embodiments of the invention may also be implemented in a system other than a cable network.

Figure 1:
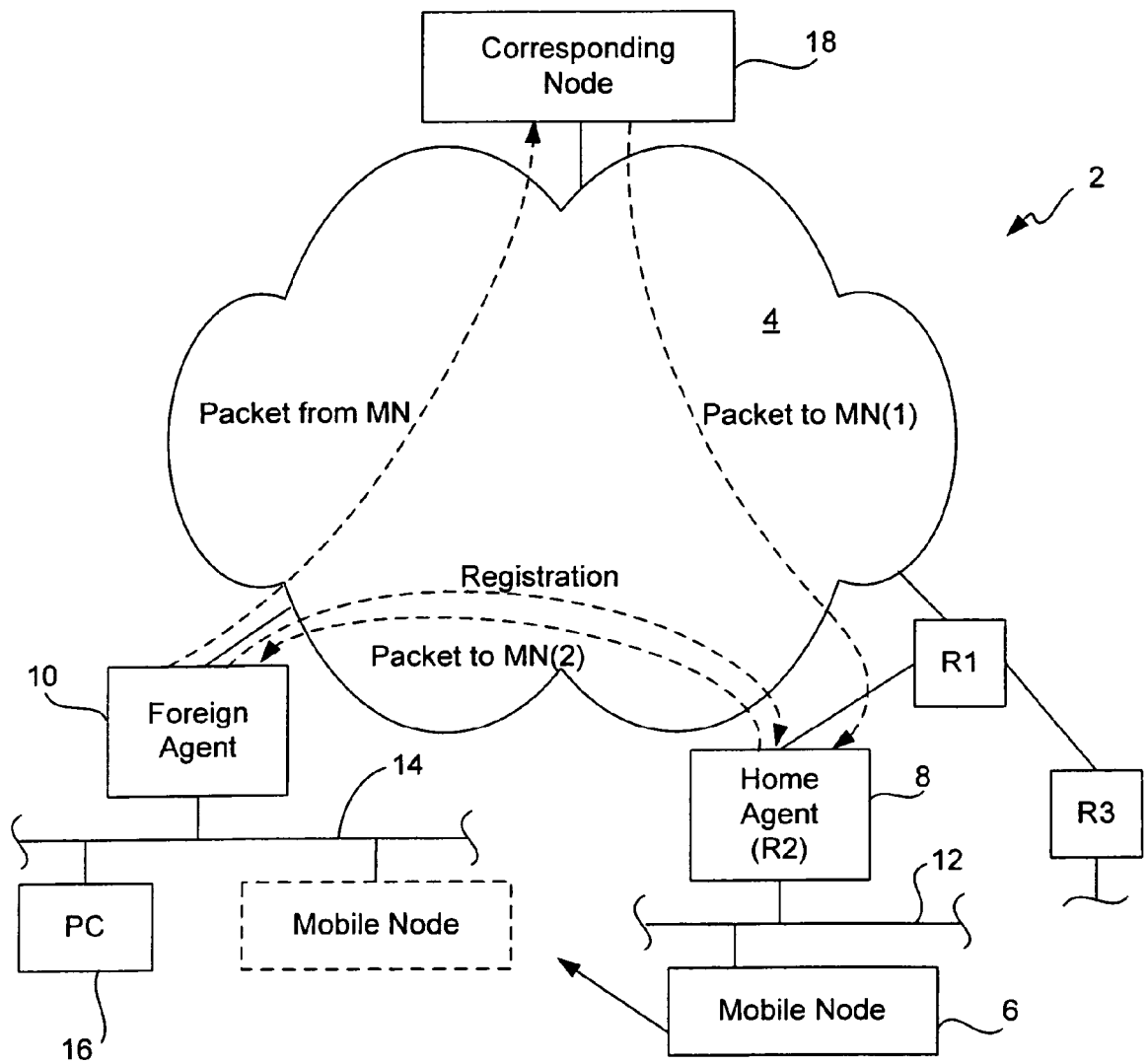
FIG. 1 is a diagram of a Mobile IP network segment and associated environment.
Figure 2:
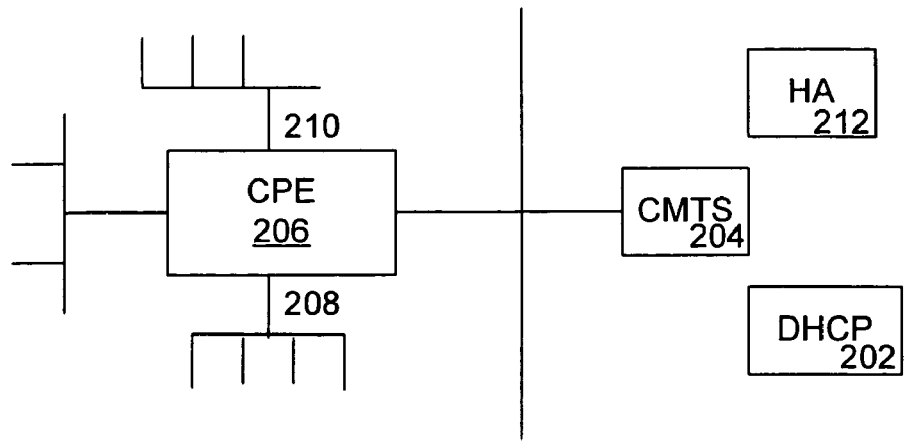
FIG. 2 is a diagram illustrating a system in which the present invention may be implemented.

FIG. 2 is a diagram illustrating a system in which the present invention may be implemented. A DHCP server 202 operates to delegate network prefixes in accordance with a Mobile IP protocol such as Mobile IPv4 or IPv6. For instance, RFC 3633 discloses a mechanism for performing Prefix Discovery. The DHCP server 202 is coupled to the Cable Modem Termination Service (CMTS) 204, which serves as the cable head end router. In accordance with one embodiment, a network prefix is allocated by the DHCP server 202 to the Customer Premises Edge (CPE) router 206, which may be a router having a cable modem in a cable network that is located at the "edge" of the network. For instance, the CPE router 206 may send a DHCP request to the DHCP server 202, which then provides the network prefix to the CPE router 206 in a DHCP reply. The CPE router 206 is generally referred to as an "edge router" since it is a first hop router to the customer provider network.

Typically, service providers do not want to enable Home Agent services on a Customer Premises Edge (CPE) router. Thus, in accordance with various embodiments of the invention, the CPE router operates as a virtual Home Agent to manage the network prefix that has been delegated to it, as well as act as a proxy Home Agent to assist in routing traffic to mobile nodes that it supports. However, the Home Agent still continues to operate to maintain its Mobility Binding Table, which maps mobile nodes to their care-of addresses, as well as process Mobile IP registrations (registration requests/binding updates).

In accordance with one embodiment, the CPE router 206 divides the network prefix that it receives among a plurality of interfaces of the CPE router 206. In this example, the network prefix is divided among two interfaces, 208 and 210. In addition, the CPE router 206 may also assign a home address to Mobile Nodes that are attached to the interfaces 208, 210 of the CPE router based upon the network prefix.

In accordance with various embodiments, the Home Agent 212 "owns" the network prefix that is allocated to the CPE router 206 by the DHCP server 202. The Home Agent 212, upon receiving a registration request in accordance with Mobile IPv4 or a binding update in accordance with Mobile IPv6, initiates Duplicate Address Detection (DAD) in accordance with RFC 2461 and RFC 2462 (DAD is typically performed only in Mobile IPv6), which are incorporated herein by reference for all purposes. The CPE 206 then performs DAD to ensure that addresses that have been allocated by the CPE router 206 are not already being used by another node, as will be described in further detail below with reference to FIG. 7. If the address is not in use, the Home Agent 212 continues with the registration process, as will be described in further detail below with reference to FIG. 6.

Figure 3A:
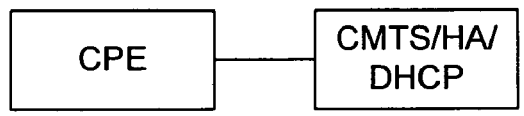
FIGS. 3A-C are diagrams illustrating different configurations for ensuring that the Home Agent is made aware of which prefix the Customer Premises Edge (CPE) router was allocated by the DHCP server.
Figure 3B:
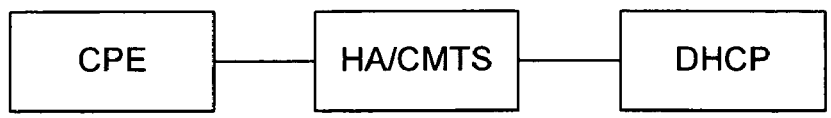
Figure 3C:
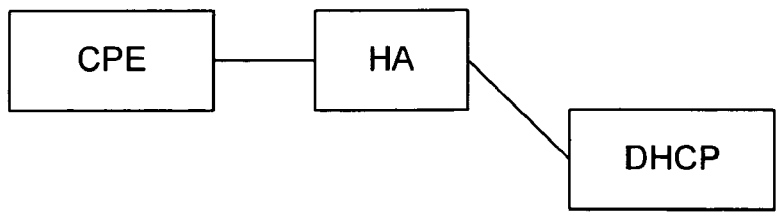

As set forth above, the Home Agent 212 is aware of the network prefix that has been allocated to the CPE router 206. This may be accomplished via a variety of network configurations or communication schemes. FIGS. 3A-C are diagrams illustrating different configurations for ensuring that the Home Agent is made aware of which prefix the Customer Premises Edge (CPE) router was allocated by the DHCP server. As shown in FIG. 3A, the CMTS 204 may be implemented in combination with the Home Agent 212 and DHCP server 202. Alternatively, the Home Agent 212 may be implemented in the CMTS 204, which is coupled to the DHCP server 202, as shown in FIG. 3B. Thus, the Home Agent serves as relay agent to provide the allocated network prefix to the CPE router 206. In FIG. 3C, the Home Agent 212 is coupled to the DHCP server 202, and access the DHCP server 202 itself. Thus, when the CPE router 206 sends a DHCP request to the Home Agent 212, the Home Agent 212 obtains a network prefix from the DHCP server 202 and provides the allocated network prefix to the CPE router 206. In this manner, the network prefix may be "homed" at the CPE router.

Figure 4:
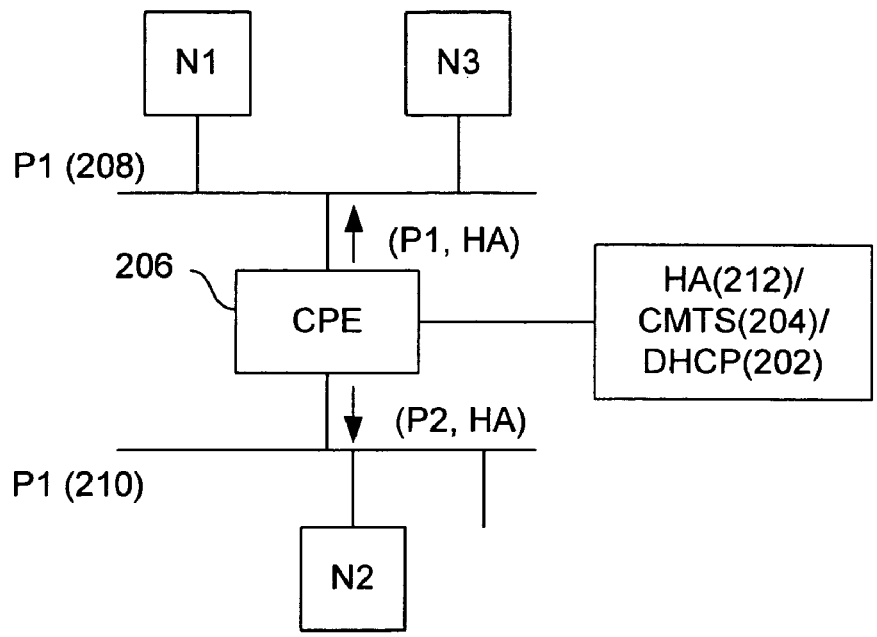
FIG. 4 is diagram illustrating a system in enabling prefixes to be assigned in accordance with various embodiments of the invention.

FIG. 4 is diagram illustrating a system in enabling prefixes to be assigned in accordance with various embodiments of the invention. As set forth above, when the network prefix is delegated to the CPE router 206, it divides the network prefix among its interfaces 208, 210. As shown, network prefix P1 is associated with interface 208 and network prefix P2 is associated with interface 210. In this manner, home addresses may be assigned to nodes N1, N2, and N3 based upon the network prefixes. Specifically, nodes N1 and N3 may be assigned home addresses based upon the prefix P1 and node N2 may be assigned a home address based upon the prefix P2.

Generally, the Home Agent sends an advertisement in accordance with RFC 3775, which is incorporated herein by reference for all purposes. However, in accordance with various embodiments of the invention, the CPE router 206 sends information in an advertisement, which enables the nodes attached to the CPE router 206 to ascertain whether they are located at their home network. If they are not located at their home network, they may send a registration request or binding update to their Home Agent to register their current care-of address with the Home Agent. Thus, the CPE router 206 may send an advertisement from each of its interfaces, which identifies a network prefix associated with the corresponding interface, as well as a Home Agent address of the Home Agent supporting the network prefix. If the network prefix provided in the advertisement is different from that of the home address of the Mobile Node on that particular interface, the Mobile Node recognizes that it is not on its home network. However, if the network prefix provided in the advertisement is the same as that of the home address of the Mobile Node on that particular interface, the Mobile Node recognizes that it is on its home network (which is actually a virtual home network, since it is not located on a physical interface of the Home Agent).

Figure 5:
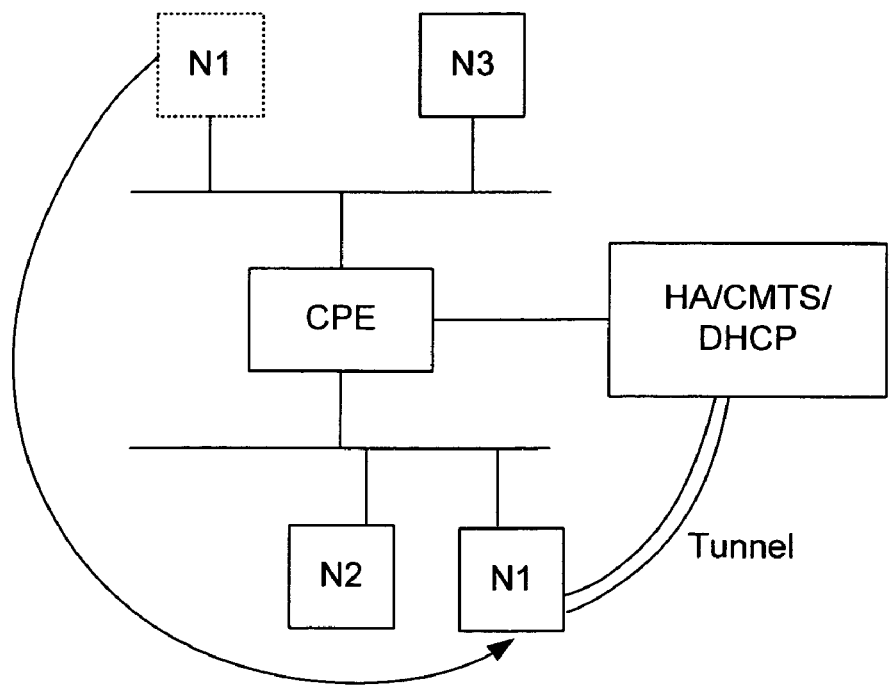
FIG. 5 is a diagram illustrating the system of FIG. 3 after Node N1 roams to another location within the network.

FIG. 5 is a diagram illustrating the system of FIG. 3 after Node N1 roams to another location within the network. When the Node N1 roams to another location within the cable network, it attempts to register with its Home Agent. The Home Agent initiates DAD via the CPE router 206 to ensure that the home address is not duplicated, and processes the registration request or binding update accordingly, as will be described in further detail below with reference to FIG. 6

Figure 6:
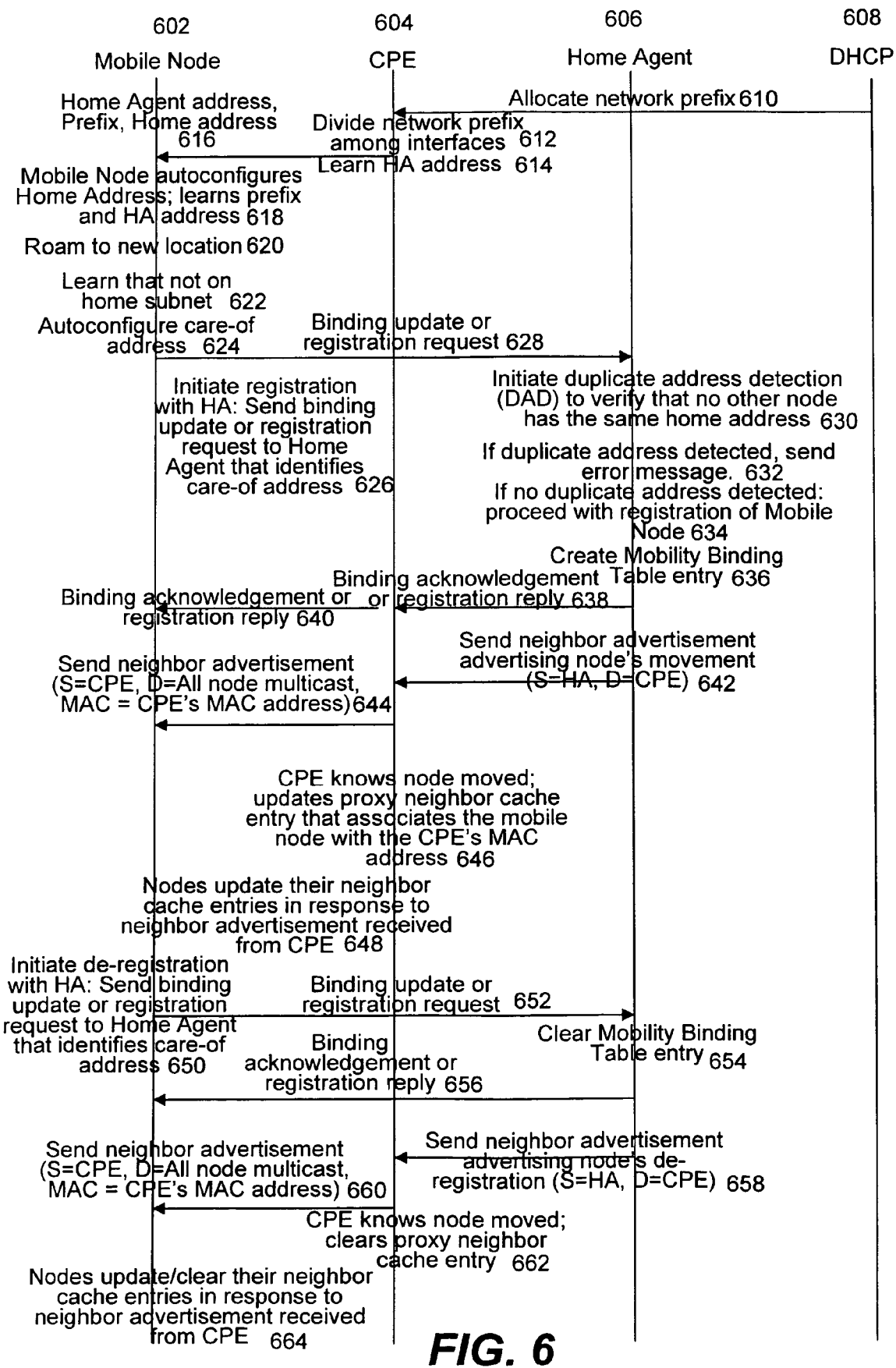
FIG. 6 is a transaction flow diagram illustrating a method of performing Home Address management in accordance with various embodiments of the invention.

FIG. 6 is a transaction flow diagram illustrating a method of performing Home Address management in accordance with various embodiments of the invention. The steps performed by the Mobile Node, CPE router, Home Agent, and DHCP server will be described with reference to vertical lines 602, 604, 606, and 608, respectively. As shown at 610, the DHCP server allocates a network prefix to the CPE router 604 in accordance with RFC 3633, which is incorporated herein by reference for all purposes. Specifically, this may be provided in response to a DHCP request transmitted to the DHCP server 608 by the CPE router 604. When the CPE router receives the network prefix, it divides the network prefix among one or more of the interfaces of the CPE router at 612. In addition, the CPE router may also identify a Home Agent that is associated with the network prefix at 614. In other words, the CPE router identifies the Home Agent that supports or "owns" the network prefix. For instance, the CPE router may obtain the Home Agent address from the DHCP reply received from the DHCP server or, alternatively, the CPE router may send a request for the Home Agent address associated with the network prefix to the DHCP server. The CPE router may then send an advertisement from one or more of its interfaces (e.g., each of its interfaces) which includes the network prefix associated with the corresponding interface and/or the Home Agent address of the Home Agent supporting the network prefix at 616. Specifically, the advertisement may be an ICMP router advertisement sent in accordance with RFC 3775, which is incorporated herein by reference for all purposes. In addition, the CPE router may also allocate a home address to each of the nodes (e.g., Mobile Nodes) connected to the corresponding interface(s). Thus, at 618, a Mobile Node connected to one of the interfaces of the CPE router may ascertain its home address, a Home Agent address, and the corresponding network prefix associated with its "virtual home" network.

When the Mobile Node roams to a new location at 620, it learns that it is no longer on its "home" subnet at 622. For instance, the Mobile Node may compare its network prefix (e.g., obtained from the advertisement) with the new subnet being advertised by the interface of the CPE router to which the Mobile Node has roamed and via which the Mobile Node wishes to receive packets.

Once the Mobile Node has learned that it is not on its home subnet, it composes a Mobile IP packet to register with its Home Agent. The Mobile IP packet may be a registration request transmitted in accordance with Mobile IPv4 or, alternatively, the Mobile IP packet may be a Binding Update transmitted in accordance with Mobile IPv6 as set forth in RFC 3775, which is incorporated herein by reference for all purposes. Any extensions or options may be provided, as appropriate.

In order to compose the Mobile IP packet, the Mobile Node autoconfigures a care-of address at 624. The Mobile Node then initiates registration with its Home Agent by sending the Mobile IP packet (e.g., registration request or binding update) including the care-of address to the Home Agent at 626. It is important to note that the care-of address may be associated with a Foreign Agent, if the system is implemented in an environment supporting Mobile IPv4. Moreover, the care-of address may identify the CPE router. The Mobile Node then transmits the Mobile IP packet to the Home Agent at 628.

When the Home Agent receives the Mobile IP packet (e.g., registration request or binding update) from the Mobile Node, it initiates Duplicate Address Detection (DAD) at 630 to verify that no other Mobile Node has the same home address. Typically, the Home Agent performs DAD on its physical links. However, in accordance with one embodiment, the Home Agent merely initiates DAD, which is performed by the CPE router, as will be described in further detail with reference to FIG. 7. DAD is performed in accordance with RFC 2461 and RFC 2462, which are incorporated herein by reference for all purposes.

If a duplicate address is detected, the Home Agent may send an error message at 632 to the Mobile Node, and registration with the Home Agent is not completed. However, if a duplicate address is not detected, the Home Agent proceeds with the registration of the Mobile Node at 634. For instance, the Home Agent creates an entry in its Mobility Binding Table at 636 that associates the Mobile Node (e.g., its home address) with its care-of address.

Upon completion of a successful registration, the Home Agent may send a Mobile IP message such as a registration reply or binding acknowledgement message to the Mobile Node at 638, which may be routed by the CPE router to the Mobile Node at 640. The Home Agent also sends a neighbor advertisement in accordance with RFC 2461 to the CPE router at 642 indicating that one of the nodes has roamed to a new location (e.g., care-of address or a MAC address associated with one of the interfaces of the CPE router). The CPE then sends a neighbor advertisement to one or more of the nodes connected to its interfaces at 644. For instance, the neighbor advertisement may be sent to an all node multicast address. Since the CPE router received the neighbor advertisement from the Home Agent, it now knows that the identified node has moved and updates its proxy neighbor cache entry to indicate that the node has roamed to the new location at 646. In addition, the nodes receiving the neighbor advertisement also update their own neighbor cache to indicate that the node has roamed to the new location at 648. Specifically, the neighbor advertisement received from the CPE indicates that the node's new MAC address is the CPE's MAC address.

Once the registration has been successfully completed, the CPE router may intercept packets addressed to nodes connected to the interfaces of the CPE router. The CPE router may then forward the packets directly to the nodes, or tunnel the packets to the Home Agent that is associated with the corresponding network prefix. Thus, when a node moves from interface L1 to interface L2 and the CPE receives router traffic for interface L1, the CPE intercepts this traffic and may send the traffic directly to the node, now visiting on interface L2. Alternatively, the CPE may tunnel the traffic for the node to the Home Agent. The Home Agent is aware that the node is visiting the CPE on interface L2 and is aware of the node's care-of address. Accordingly, the Home Agent tunnels the traffic to the care-of address on interface L2.

Similarly, when a Mobile Node moves to a new location, it may initiate de-registration with the Home Agent (e.g., by setting the lifetime requested to zero) at 650. Specifically, the Mobile Node may send a Mobile IP message such as a registration request or binding update including the care-of address at 652 to the Home Agent. The Home Agent then updates its neighbor cache to reflect the movement of the Mobile Node to a new location. Specifically, in this instance, the Home Agent may simply clear the neighbor cache entry associated with the Mobile Node at 654. The Home Agent may then send a Mobile IP message such as a registration reply or binding acknowledgement at 656 to the Mobile Node.

The Home Agent then sends a neighbor advertisement at 658 to the CPE router advertising the Mobile Node's de-registration. The CPE router then sends a neighbor advertisement at 660 as set forth above. The CPE router may then update its neighbor cache (e.g., by deleting the appropriate neighbor cache entry) at 662. The nodes (e.g., Mobile Nodes) that have received the neighbor advertisement may then also update their neighbor cache (e.g., by deleting the appropriate neighbor cache entry) at 664.

Figure 7:
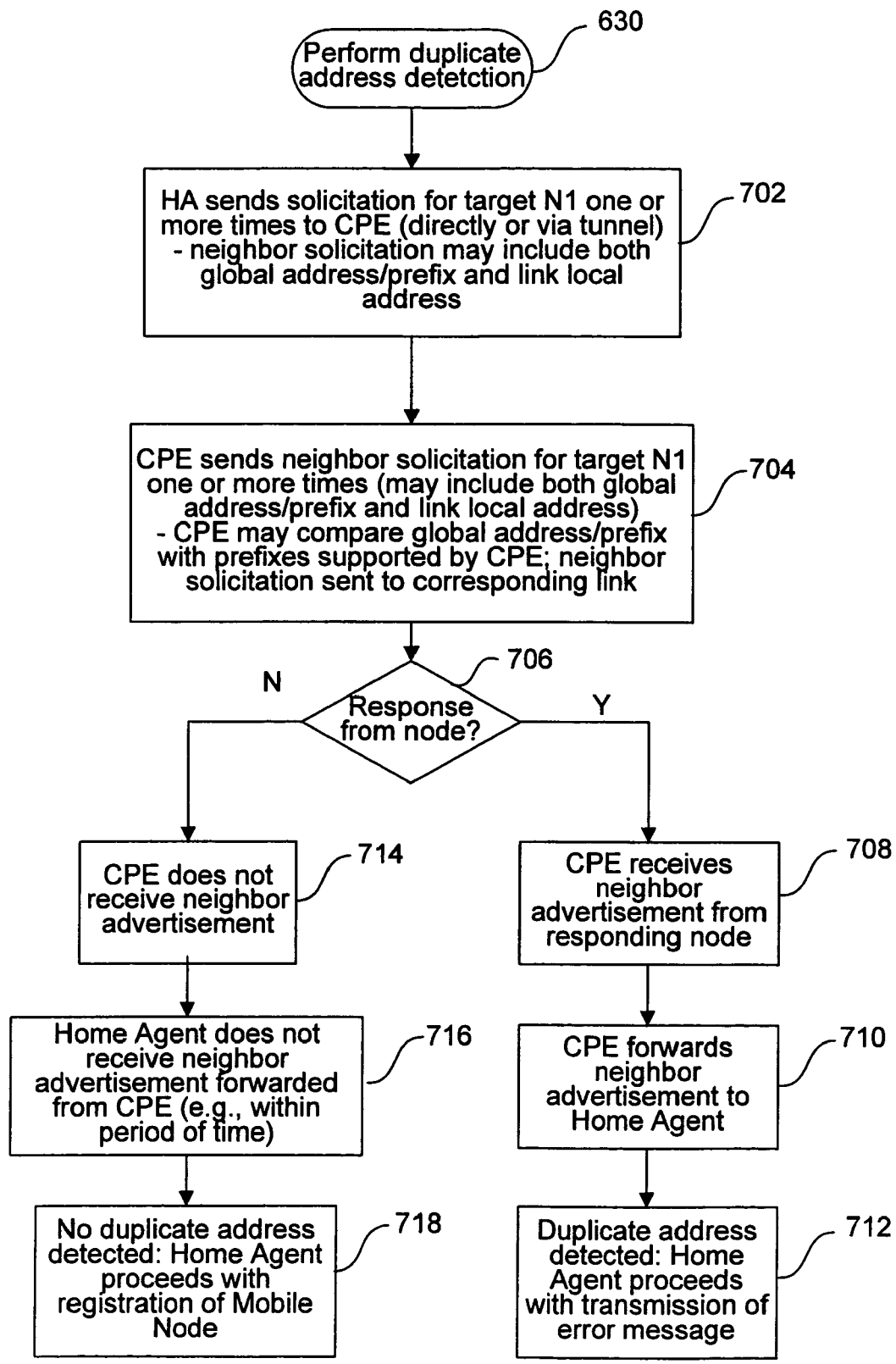
FIG. 7 is a process flow diagram illustrating a method of performing duplicate address detection as shown at step 630 of FIG. 6.

As described above, the Home Agent initiates DAD to ensure that the home address that the Mobile Node has been assigned is not already in use by another node. FIG. 7 is a process flow diagram illustrating a method of performing duplicate address detection as shown at step 630 of FIG. 6. As shown, the Home Agent may initiate the DAD process by sending a neighbor solicitation to the CPE router for the target node (N1) to ascertain whether any other nodes are using node N1's home address at 702. Alternatively, the Home Agent may send a message requesting that the CPE perform DAD for the identified node N1. For instance, the Home Agent may send the neighbor solicitation directly to the CPE router, or via a tunnel established between the Home Agent and the CPE router. Typically, the neighbor solicitation includes a link local address of the node. In accordance with one embodiment, the neighbor solicitation may also include a global address and/or network prefix. The Home Agent may choose to re-send the neighbor solicitation any number of times if the Home Agent does not receive a neighbor advertisement in response.

The CPE router then sends a neighbor solicitation for the target node at 704. For instance, the CPE router may compare the global address or network prefix specified in the neighbor solicitation received from the Home Agent with those network prefixes supported by the CPE router. The CPE router may then send the neighbor solicitation to the appropriate network interface/link. If a CPE router does not receive a neighbor advertisement from one of the nodes in response to the neighbor solicitation, the CPE router may choose to re-send the neighbor solicitation any number of times. The presence of a duplicate address is then ascertained based upon whether a response has been received from a node, as shown at 706.

If the CPE router does receive a neighbor advertisement from a responding node at 708, this means that the node is indicating that it is also using the address in question. The CPE router may then choose to forward this neighbor advertisement at 710 to the Home Agent indicate that there is a conflict. Since the Home Agent has been notified of the duplicate address that has been detected, the Home Agent may proceed with the transmission of an error message at 712.

If the CPE router does not receive a neighbor advertisement from a responding node at 714, this means that there is most likely no conflict with another node. Of course, the CPE router may choose to wait for a predetermined period of time or re-send the neighbor solicitation. If the Home Agent does not receive a notification (e.g., forwarded neighbor advertisement) from the CPE router indicating that another node is using the address at 716, no duplicate address has been detected. The Home Agent may then proceed with the registration of the Mobile Node at 718.

The invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, and optical data storage devices.

The apparatus (e.g. Mobile Node, Home Agent, CPE router, or Foreign Agent) of this invention may be specially constructed for the required purposes, or may be a general purpose programmable machine selectively activated or reconfigured by a computer program stored in memory. The processes presented herein are not inherently related to any particular router or other apparatus. In a preferred embodiment, any of the Home and Foreign Agents of this invention, as well as the CPE router, may be specially configured routers such as specially configured router models 1700, 1800, 2500, 2600, 3200, 3600, 4000, 4500, 4700, 7200, and 7500 available from Cisco Systems, Inc. of San Jose, Calif. In addition, the CPE router may implement Access Point functionality. A general structure for some of these machines will appear from the description given below.

Generally, the techniques of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid route optimization system of this invention is preferably implemented on a general-purpose programmable machine selectively activated or reconfigured by a computer program stored in memory. Such programmable machine may be a network device designed to handle network traffic. Such network devices typically have multiple network interfaces including frame relay, ISDN, and wireless interfaces, for example. Specific examples of such network devices include routers and switches. For example, the roaming systems of this invention may be specially configured routers such as specially configured router models 350, 1100, 1200, 1400, 1600, 2500, 2600, 3200, 3600, 4500, 4700, 7200, 7500, and 12000 available from Cisco Systems, Inc. of San Jose, Calif. A general architecture for some of these machines will appear from the description given below. In an alternative embodiment, the key generation and registration system may be implemented on a general-purpose network host machine such as a personal computer or workstation. Further, the invention may be at least partially implemented on a card (e.g., an interface card) for a network device or a general-purpose computing device.

Figure 8:
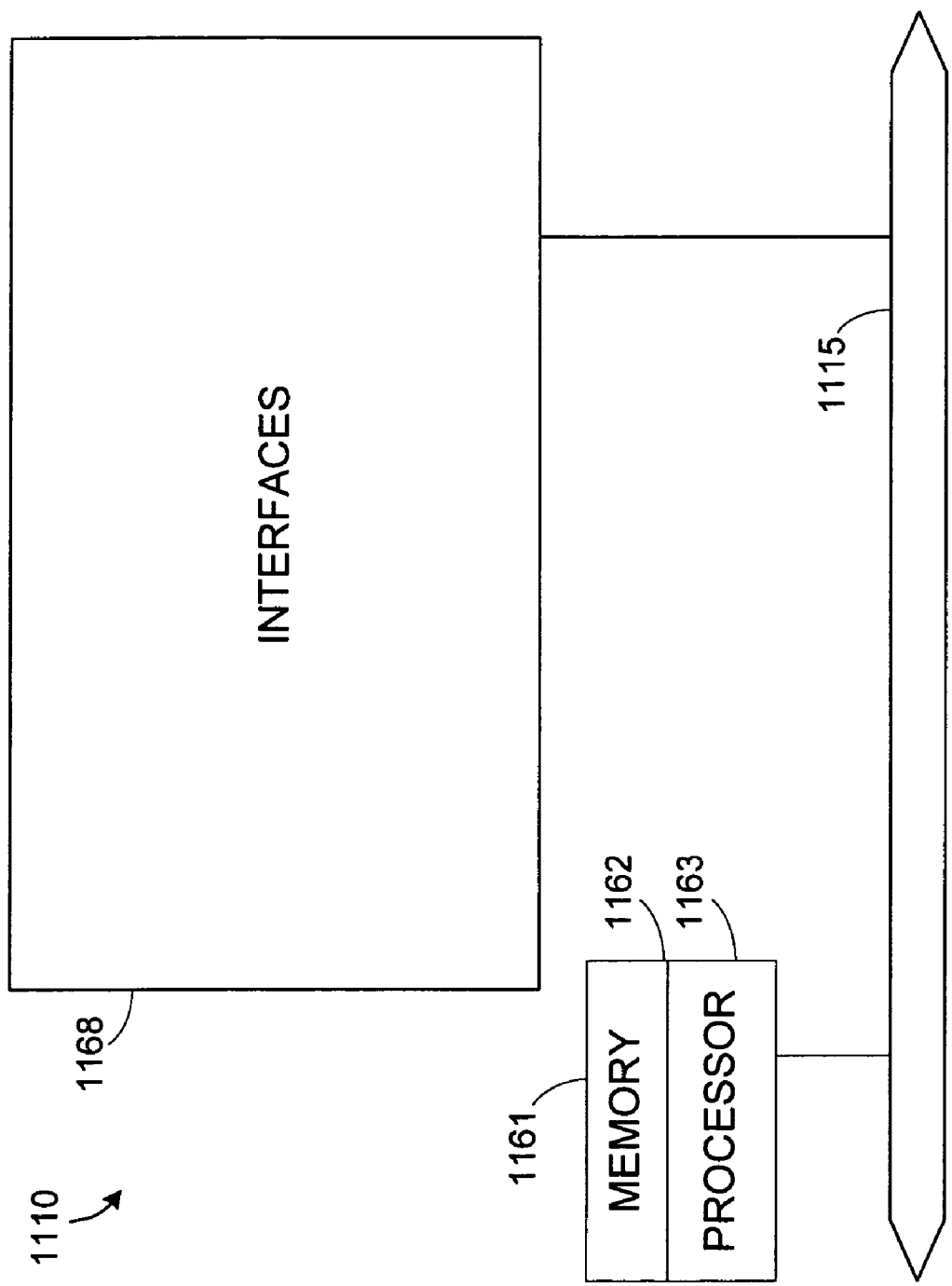
FIG. 8 is a diagrammatic representation of a router in which embodiments of the present invention may be implemented.

Referring now to FIG. 8, a router 1110 suitable for implementing the present invention includes a master central processing unit (CPU) 1162, interfaces 1168, and a bus 1115 (e.g., a PCI bus). When acting under the control of appropriate software or firmware, the CPU 1162 is responsible for such router tasks as routing table computations and network management. It may also be responsible for updating mobility binding and visitor tables, etc. It preferably accomplishes all these functions under the control of software including an operating system (e.g., the Internetwork Operating System (IOS®) of Cisco Systems, Inc.) and any appropriate applications software. CPU 1162 may include one or more processors 1163 such as a processor from the Motorola family of microprocessors or the MIPS family of microprocessors. In an alternative embodiment, processor 1163 is specially designed hardware for controlling the operations of router 1110. In a specific embodiment, a memory 1161 (such as non-volatile RAM and/or ROM) also forms part of CPU 1162. However, there are many different ways in which memory could be coupled to the system.

The interfaces 1168 are typically provided as interface cards (sometimes referred to as "line cards"). Generally, they control the sending and receiving of data packets over the network and sometimes support other peripherals used with the router 1110. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1162 to efficiently perform routing computations, network diagnostics, security functions, etc.

Although the system shown in FIG. 8 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 1161) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. For instance, the disclosed message formats are merely illustrative, and therefore other messages may be used to initiate DAD, notify the Home Agent of the network prefix(es) that have been allocated, and notify devices when a Mobile Node roams to a new location or de-registers. Moreover, although the example described refers primarily to IPv4 and IPv6, the present invention may be used with IP addresses that conform to other versions of IP. Therefore, the described embodiments should be taken as illustrative and not restrictive, and the invention should not be limited to the details given herein but should be defined by the following claims and their full scope of equivalents.

What is claimed is:

1. A Customer Premises Edge router, comprising:
a plurality of ports;
a memory storing therein instructions;
a processor that, when executing the instructions, performs the following steps:
processing a DHCP reply including a network prefix to obtain the network prefix, wherein the DHCP reply has been received from a DHCP server via one of the plurality of ports in response to a DHCP request, wherein the network prefix is owned by a Home Agent, wherein the DHCP reply does not include an IP address;
dividing the network prefix among the plurality of ports of the Customer Premises Edge router; and
assigning a home address based upon dividing the network prefix to one or more nodes on the plurality of ports, wherein the nodes support Mobile IP.

2. The Customer Premises Edge Router as recited in claim 1, wherein assigning is not performed prior to receiving the DHCP reply including the network prefix.

3. The Customer Premises Edge Router as recited in claim 1, wherein the nodes are associated with the Home Agent.

4. The Customer Premises Edge Router as recited in claim 1, wherein the Home Agent receives the DHCP request and transmits the DHCP reply to the Customer Premises Edge router.

5. An apparatus, comprising:
a plurality of ports;
a memory storing therein instructions;
a processor that, when executing the instructions, performs the following steps:
processing a DHCP reply including a network prefix to obtain the network prefix, wherein the DHCP reply has been received from a DHCP server via one of the plurality of ports in response to a DHCP request;
dividing the network prefix among the plurality of ports of the apparatus;
assigning a home address based upon dividing the network prefix to one or more nodes on the plurality of ports, wherein the nodes support Mobile IP, wherein the network prefix is owned by a Home Agent; and
sending an advertisement which is forwarded from each of the plurality of ports, the advertisement including at least one of a network prefix associated with a corresponding port of the plurality of ports or a Home Agent address of the Home Agent supporting the network prefix, thereby enabling the nodes to send a registration request or binding update to the Home Agent address when the network prefix provided in the advertisement is different from that of the home address of the nodes on that port.

6. The apparatus as recited in claim 5, wherein the Home Agent is coupled to the DHCP server.

7. The apparatus as recited in claim 5, wherein the Home Agent is implemented in the DHCP server.

8. The apparatus as recited in claim 5, wherein the Home Agent is implemented in a Cable Modem Termination System.

9. The apparatus as recited in claim 5, wherein the processor, when executing the instructions, performs further steps, comprising:
identifying a Home Agent associated with the network prefix.

10. The apparatus as recited in claim 9, wherein identifying the Home Agent associated with the network prefix comprises:
obtaining the Home Agent address from the DHCP reply.

11. The apparatus as recited in claim 5, wherein the processor, when executing the instructions, performs further steps, comprising:
intercepting packets addressed to nodes on the plurality of ports of the apparatus.

12. The apparatus as recited in claim 11, wherein the processor, when executing the instructions, performs further steps comprising:
forwarding the packets directly to the nodes or tunneling the packets to a Home Agent associated with the network prefix.

13. An apparatus, comprising:
a plurality of ports;
a memory storing therein instructions;
a processor that, when executing the instructions, performs the following steps:
processing a DHCP reply including a network prefix to obtain the network prefix, wherein the DHCP reply has been received from a DHCP server via one of the plurality of ports in response to a DHCP request;
dividing the network prefix among the plurality of ports;
assigning a home address based upon dividing the network prefix to one or more nodes on the plurality of ports, wherein the nodes support Mobile IP, wherein the network prefix is owned by a Home Agent;
receiving a neighbor advertisement from the Home Agent indicating that one of the nodes has roamed to a new location;
updating a proxy neighbor cache entry to indicate that the node has roamed to the new location; and
sending a neighbor advertisement to the plurality of nodes indicating that the node has roamed to the new location.

14. The apparatus as recited in claim 13, wherein the new location is a care-of address.

15. The apparatus as recited in claim 13, wherein the new location is a MAC address associated with one of the plurality of ports of the apparatus.

16. An apparatus, comprising:
a plurality of ports;
a memory storing therein instructions;
a processor that, when executing the instructions, performs the following steps:
processing a DHCP reply including a network prefix to obtain the network prefix, wherein the DHCP reply has been received from a DHCP server via one of the plurality of ports in response to a DHCP request;
dividing the network prefix among the plurality of ports of the apparatus;
assigning a home address based upon dividing the network prefix to one or more nodes on the plurality of ports, wherein the nodes support Mobile IP, wherein the network prefix is owned by a Home Agent;
sending a neighbor solicitation to one or more of the plurality of nodes, wherein the neighbor solicitation identifies at least one address of one of the plurality of nodes that has attempted to register with the Home Agent; and
when a neighbor advertisement is received from one of the plurality of nodes, forwarding the neighbor advertisement to the Home Agent, thereby enabling the Home Agent to send an error message to the one of the plurality of nodes that has attempted to register with the Home Agent.

17. The apparatus as recited in claim 16, wherein the processor, when executing the instructions, performs further steps comprising:
receiving the neighbor solicitation from the Home Agent prior to sending the neighbor solicitation to the one or more of the plurality of nodes.

18. The apparatus as recited in claim 16, wherein the Home Agent determines that no duplicate address has been detected for one of the plurality of nodes that has attempted to register with the Home Agent when a neighbor advertisement is not received from the apparatus within a predetermined period of time.

19. The apparatus as recited in claim 16, wherein the neighbor solicitation includes at least one of a network prefix or a global address of the one of the plurality of nodes that has attempted to register with the Home Agent.

20. The apparatus as recited in claim 19, wherein the processor, when executing the instructions, performs further steps comprising:
comparing the network prefix or the global address with network prefixes supported by the apparatus;
wherein sending the neighbor solicitation comprises sending the neighbor solicitation to one of the network prefixes supported by the apparatus corresponding to the network prefix or the global address.

21. The apparatus as recited in claim 16, wherein the neighbor solicitation includes a link local address of the one of the plurality of nodes that has attempted to register with the Home Agent.

22. The apparatus as recited in claim 16, wherein the processor, when executing the instructions, performs further steps comprising:
sending an advertisement from each of the plurality of interfaces indicating that the nodes are at home.

23. The apparatus as recited in claim 22, wherein the processor, when executing the instructions, performs further steps comprising:
setting an H bit in the advertisement prior to sending the advertisement from each of the plurality of interfaces.

24. A system supporting Mobile IP for distributing network prefixes in a Customer Premises Edge router, comprising:
means for receiving a DHCP reply including a network prefix from a DHCP server in response to a DHCP request;
means for dividing the network prefix among a plurality of interfaces of the Customer Premises Edge router;
means for assigning a home address based upon the divided network prefix to one or more nodes on the plurality of interfaces, wherein the nodes support Mobile IP, wherein the network prefix is owned by a Home Agent; and
means for sending an advertisement from each of the plurality of interfaces, the advertisement including at least one of a network prefix associated with the corresponding interface or a Home Agent address of the Home Agent supporting the network prefix, thereby enabling the nodes to send a registration request or binding update to the Home Agent address when the network prefix provided in the advertisement is different from that of the home address of the nodes on that interface.

25. A system supporting Mobile IP for distributing network prefixes in a network device, comprising:
a plurality of ports;
a memory storing therein instructions;
a processor that, when executing the instructions, performs the following steps:
processing a DHCP reply including a network prefix to obtain the network prefix, wherein the DHCP reply has been received from a DHCP server in response to a DHCP request;
dividing the network prefix among a plurality of ports of the network device;
assigning a home address based upon the divided network prefix to one or more nodes on the plurality of ports, wherein the nodes support Mobile IP, wherein the network prefix is owned by a Home Agent;
receiving a neighbor advertisement from the Home Agent indicating that one of the nodes has roamed to a new location;
updating a proxy neighbor cache entry to indicate that the node has roamed to the new location; and
sending a neighbor advertisement to the plurality of nodes indicating that the node has roamed to the new location.

26. The system as recited in claim 25, wherein the network prefix is owned by a Home Agent.

27. The system as recited in claim 26, wherein the Home Agent receives the DHCP request and transmits the DHCP reply to the Customer Premises Edge router.

28. A non-transitory computer-readable storage medium storing thereon computer-readable instructions for distributing network prefixes by a Customer Premises Edge router in a system supporting Mobile IP by performing steps comprising:
processing a DHCP reply received from a DHCP server in response to a DHCP request, the DHCP reply including a network prefix, wherein the DHCP reply does not include an IP address;
dividing the network prefix among a plurality of interfaces of the Customer Premises Edge router;
assigning a home address based upon the divided network prefix to one or more nodes on the plurality of interfaces, wherein the nodes support Mobile IP, wherein the network prefix is owned by a Home Agent;
sending a neighbor solicitation to one or more of the plurality of nodes, wherein the neighbor solicitation identifies at least one address of one of the plurality of nodes that has attempted to register with the Home Agent; and
forwarding the neighbor advertisement to the Home Agent when a neighbor advertisement is received from one of the plurality of nodes, thereby enabling the Home Agent to send an error message to the one of the plurality of nodes that has attempted to register with the Home Agent.

29. A non-transitory computer-readable storage medium storing thereon computer-readable instructions by performing steps comprising:
obtaining a network prefix from a DHCP reply including the network prefix by a router, wherein the DHCP reply does not include an IP address;
dividing the network prefix by the router to generate a plurality of network prefixes;
associating each of the plurality of network prefixes with a corresponding one of the plurality of interfaces of the router such that a different network prefix is associated with each of the plurality of interfaces; and
assigning a home address to one or more nodes on one of the plurality of interfaces based upon the one of the plurality of network prefixes associated with the one of the plurality of interfaces, wherein the nodes support Mobile IP.

30. The non-transitory computer-readable storage medium as recited in claim 29, wherein the network prefix is owned by a Home Agent supporting Mobile IP.

31. The non-transitory computer-readable storage medium as recited in claim 29, wherein the router is a Customer Premises Edge Router.

32. The non-transitory computer-readable storage medium as recited in claim 29, wherein the router is not in a home network of the nodes.

33. An apparatus, comprising:
a plurality of ports;
a memory storing therein instructions;
a processor that, when executing the instructions, performs the following steps:
processing a DHCP reply including a network prefix to obtain the network prefix, wherein the DHCP reply has been received via one of the plurality of ports, wherein the DHCP reply does not include an IP address;
dividing the network prefix to generate a plurality of network prefixes;
associating each of the plurality of network prefixes with a corresponding one of the plurality of ports such that a different network prefix is associated with each of the plurality of ports and
assigning a home address to one or more nodes on one of the plurality of ports based upon the one of the plurality of network prefixes associated with the one of the plurality of ports, wherein the nodes support Mobile IP.

34. The apparatus as recited in claim 33, wherein the network prefix is owned by a Home Agent supporting Mobile IP.

35. A method, comprising:
receiving a DHCP reply including a network prefix by a network device from a DHCP server in response to a DHCP request;
dividing the network prefix among a plurality of interfaces of the network device;
assigning a home address based upon the divided network prefix to one or more nodes on the plurality of interfaces, wherein the nodes support Mobile IP, wherein the network prefix is owned by a Home Agent; and
sending an advertisement from each of the plurality of interfaces, the advertisement including at least one of a network prefix associated with the corresponding interface or a Home Agent address of the Home Agent supporting the network prefix, thereby enabling the nodes to send a registration request or binding update to the Home Agent address when the network prefix provided in the advertisement is different from that of the home address of the nodes on that interface.

36. The method as recited in claim 35, further comprising:
identifying a Home Agent associated with the network prefix.

37. The method as recited in claim 36, wherein identifying the Home Agent associated with the network prefix comprises:
obtaining the Home Agent address from the DHCP reply.

38. The method as recited in claim 35, further comprising:
intercepting packets addressed to nodes on the plurality of interfaces of the network device.

39. The method as recited in claim 38, further comprising:
forwarding the packets directly to the nodes or tunneling the packets to a Home Agent associated with the network prefix.

40. The method as recited in claim 35, wherein the network device is a Customer Premises Edge Router.

41. A method, comprising:
receiving a DHCP reply including a network prefix, wherein the DHCP reply does not include an IP address;
dividing the network prefix to generate a plurality of network prefixes;
associating each of the plurality of network prefixes with a corresponding one of a plurality of interfaces of a network device such that a different network prefix is associated with each of the plurality of interfaces; and
assigning a home address to one or more nodes on one of the plurality of interfaces based upon the one of the plurality of network prefixes associated with the one of the plurality of interfaces, wherein the nodes support Mobile IP.

42. The method as recited in claim 41, wherein the network prefix is owned by a Home Agent supporting Mobile IP.

43. An apparatus, comprising:
means for receiving a DHCP reply including a network prefix, wherein the DHCP reply does not include an IP address;
means for dividing the network prefix to generate a plurality of network prefixes;
means for associating each of the plurality of network prefixes with a corresponding one of a plurality of interfaces of a network device such that a different network prefix is associated with each of the plurality of interfaces; and
means for assigning a home address to one or more nodes on one of the plurality of interfaces based upon the one of the plurality of network prefixes associated with the one of the plurality of interfaces, wherein the nodes support Mobile IP.

44. A method, comprising:
receiving a DHCP reply including a network prefix from a DHCP server in response to a DHCP request;
dividing the network prefix among a plurality of interfaces of a network device;
assigning a home address based upon the divided network prefix to one or more nodes on the plurality of interfaces, wherein the nodes support Mobile IP, wherein the network prefix is owned by a Home Agent;
sending a neighbor solicitation to one or more of the plurality of nodes, wherein the neighbor solicitation identifies at least one address of one of the plurality of nodes that has attempted to register with the Home Agent; and
when a neighbor advertisement is received from one of the plurality of nodes, forwarding the neighbor advertisement to the Home Agent, thereby enabling the Home Agent to send an error message to the one of the plurality of nodes that has attempted to register with the Home Agent.

45. The method as recited in claim 44, further comprising:
receiving the neighbor solicitation from the Home Agent prior to sending the neighbor solicitation to the one or more of the plurality of nodes.

46. The method as recited in claim 44, wherein the Home Agent determines that no duplicate address has been detected for one of the plurality of nodes that has attempted to register with the Home Agent when a neighbor advertisement is not received from the network device within a predetermined period of time.

47. The method as recited in claim 44, wherein the neighbor solicitation includes at least one of a network prefix or a global address of the one of the plurality of nodes that has attempted to register with the Home Agent.

48. The method as recited in claim 44, wherein the neighbor solicitation includes a link local address of the one of the plurality of nodes that has attempted to register with the Home Agent.

49. The method as recited in claim 44, further comprising:
sending an advertisement from each of the plurality of interfaces indicating that the nodes are at home.

* * * * *